(12) United States Patent
Yadav et al.

(10) Patent No.: US 11,379,315 B2
(45) Date of Patent: Jul. 5, 2022

(54) SYSTEM AND METHOD FOR A BACKUP DATA VERIFICATION FOR A FILE SYSTEM BASED BACKUP

(71) Applicant: EMC IP Holding Company LLC, Hopkinton, MA (US)

(72) Inventors: Sunil Yadav, Bangalore (IN); Manish Sharma, Bangalore (IN); Aaditya Rakesh Bansal, Bangalore (IN); Shelesh Chopra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 151 days.

(21) Appl. No.: 16/987,533

(22) Filed: Aug. 7, 2020

(65) Prior Publication Data

US 2022/0043717 A1 Feb. 10, 2022

(51) Int. Cl.
*G06F 11/14* (2006.01)
*G06F 11/07* (2006.01)

(52) U.S. Cl.
CPC ...... *G06F 11/1464* (2013.01); *G06F 11/0793* (2013.01); *G06F 11/1435* (2013.01); *G06F 11/1461* (2013.01); *G06F 11/1469* (2013.01)

(58) Field of Classification Search
CPC ............. G06F 11/1458; G06F 11/1469; G06F 11/1435; G06F 11/144; G06F 11/1464
USPC .......................................................... 711/162
See application file for complete search history.

(56) References Cited

U.S. PATENT DOCUMENTS

| | | | |
|---|---|---|---|
| 2017/0235641 A1* | 8/2017 | Ancel | G06F 16/1774 707/654 |
| 2018/0322017 A1* | 11/2018 | Maccanti | G06F 11/1451 |
| 2019/0278662 A1* | 9/2019 | Nagrale | G06F 9/45558 |
| 2020/0117550 A1* | 4/2020 | Zhang | G06F 11/1464 |

* cited by examiner

*Primary Examiner* — Than Nguyen
(74) *Attorney, Agent, or Firm* — Chamberlain, Hrdlicka, White, Williams & Aughtry (57) ABSTRACT

A method for verifying data includes obtaining, by a backup agent, a backup verification trigger for a backup stored in a backup storage system, in response to the backup verification trigger, obtaining backup metadata associated with the backup, performing a hierarchical structure data mapping based on the backup metadata to obtain a hierarchical structure associated with the backup, performing, using the hierarchical structure, a backup verification to generate a backup health state of the backup, after the backup verification is generated: making a determination, based on the backup verification, that the backup health state is not in a healthy state, and in response to the determination, performing a remediation of the backup policies.

20 Claims, 7 Drawing Sheets

SYSTEM AND METHOD FOR A BACKUP DATA VERIFICATION FOR A FILE SYSTEM BASED BACKUP

BACKGROUND

Computing devices may include any number of internal components such as processors, memory, and persistent storage. Each of the internal components of a computing device may be used to generate data and to execute functions. The process of generating, storing, and sending data may utilize computing resources of the computing devices such as processing and storage. The utilization of the aforementioned computing resources to generate data and to send data to other computing devices may impact the overall performance of the computing resources.

SUMMARY

In general, in one aspect, the invention relates to a method for performing backup operations. The method includes obtaining, by a backup agent, a backup verification trigger for a backup stored in a backup storage system, in response to the backup verification trigger, obtaining backup metadata associated with the backup, performing a hierarchical structure data mapping based on the backup metadata to obtain a hierarchical structure associated with the backup, performing, using the hierarchical structure, a backup verification to generate a backup health state of the backup, after the backup verification is generated: making a determination, based on the backup verification, that the backup health state is not in a healthy state, and in response to the determination, performing a remediation of the backup policies.

In general, in one aspect, the invention relates to a system that includes a processor and memory that includes instructions which, when executed by the processor, perform a method. The method includes obtaining, by a backup agent, a backup verification trigger for a backup stored in a backup storage system, in response to the backup verification trigger, obtaining backup metadata associated with the backup, performing a hierarchical structure data mapping based on the backup metadata to obtain a hierarchical structure associated with the backup, performing, using the hierarchical structure, a backup verification to generate a backup health state of the backup, after the backup verification is generated: making a determination, based on the backup verification, that the backup health state is not in a healthy state, and in response to the determination, performing a remediation of the backup policies.

In general, in one aspect, the invention relates to a non-transitory computer readable medium that includes computer readable program code, which when executed by a computer processor enables the computer processor to perform a method for performing backup operations. The method includes obtaining, by a backup agent, a backup verification trigger for a backup stored in a backup storage system, in response to the backup verification trigger, obtaining backup metadata associated with the backup, performing a hierarchical structure data mapping based on the backup metadata to obtain a hierarchical structure associated with the backup, performing, using the hierarchical structure, a backup verification to generate a backup health state of the backup, after the backup verification is generated: making a determination, based on the backup verification, that the backup health state is not in a healthy state, and in response to the determination, performing a remediation of the backup policies.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, one or more embodiments of the invention relates to systems and methods for performing verification of data in backups stored in a backup storage system. The verification may be performed by initiating a hierarchical structure data mapping using backup metadata stored prior to the creation of the backup. The hierarchical structure data mapping is used to access the data from the backup storage system and verify that the data has not been damaged while stored in the backup storage system.

Further, embodiments of the invention relate to systems and methods for generating the backups such that secondary backup verification is enabled. Embodiments of the invention generate backup tokens stored in a secondary storage system. During the secondary verification at a later point in time, the backup token may be compared to a second backup token generated during the second verification using the backup data stored in the backup storage system at the time of the second verification to determine whether the backup data is in a healthy state.

Figure 1:
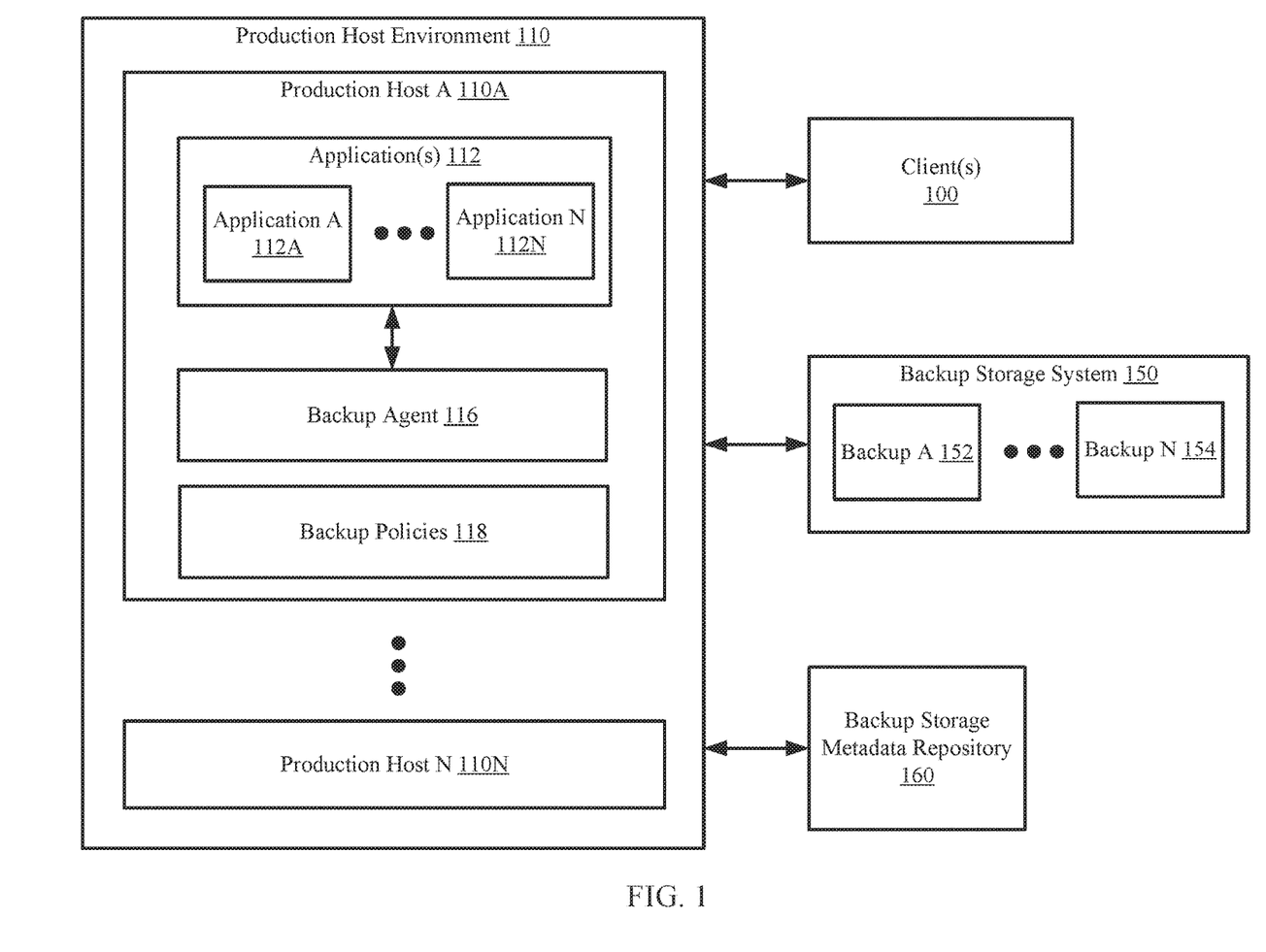
FIG. 1 shows a diagram of a system in accordance with one or more embodiments of the invention.

FIG. 1 shows a diagram of a system in accordance with one or more embodiments of the invention. The system may include one or more clients (100), a production host environment (110), a backup storage system (150), and a backup storage metadata repository (160). The system may include additional, fewer, and/or different components without departing from the invention. Each component may be operably connected to any of the other components via any combination of wired and/or wireless connections. Each of the aforementioned components is discussed below.

In one or more embodiments of the invention, the production host environment (110) is a grouping of production hosts (110) that each provide services to the clients (100). Each production host (110A, 110N) in the production host environment (110) includes applications (112), a backup agent (116), a block-based write tracker (118), a backup storage metadata repository (119A), and a file system storage information (119B). The production hosts (110A, 110N) may include additional, fewer, and/or different components without departing from the invention. Each of the aforementioned components illustrated in FIG. 1 are discussed below.

In one or more embodiments of the invention, a production host (110A, 110N) hosts one or more applications (112). In one or more embodiments of the invention, the applications (112) perform services for clients (e.g., 100). The services may include writing, reading, and/or otherwise modifying data that is stored in the production host (110A, 110N). The applications (112) may each include functionality for writing data to the production host (110A, 110N) and for notifying the block based write tracker (118) of data written to a persistent storage system in the production host (110A, 110N). The applications may be, for example, instances of databases, email servers, and/or other applications. The applications (112A, 112N) may host other types of applications without departing from the invention.

In one or more of embodiments of the invention, each application (112A, 112N) is implemented as computer instructions, e.g., computer code, stored on a persistent storage that when executed by a processor(s) of the production host (e.g., 110A, 110N) cause the production host (110A, 110N) to provide the functionality of the applications (e.g., 112A, 112N) described throughout this application.

In one or more embodiments of the invention, the production host (110A, 110N) further includes a backup agent (116). The backup agent (116) may include functionality for generating backups of a file system. In one or more embodiments of the invention, a file system is an organizational data structure that tracks how data is stored and retrieved in a system (e.g., in persistent storage of a production host (110A, 110N) or of the production host environment (110)). The file system may specify references to assets and any data blocks associated with each asset. An asset may be an individual data object in the file system. An asset may be, for example, a file. The backup generated may include a copy of the assets for one or more specified applications associated with a specified point in time. The backup of the file system may be generated via the method illustrated in FIG. 3B. The backup of the file system may be generated via any other method without departing from the invention.

In one or more embodiments of the invention, the backup agent (116) may generate the backups based on backup policies (118) implemented by the backup agent (116). The backup policies (118) may specify a schedule in which the applications (e.g., 112A, 112N) are to be backed up. The backup agent (116) may be triggered to execute a backup in response to a backup policy. Alternatively, one or more of the backups (152, 154) may be generated in response to a backup request triggered by the client(s) (100). The backup request may specify the applications to be restored.

In one or more embodiments of the invention, the backup agent (116) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (116) described throughout this application.

In one or more embodiments of the invention, the backup agent (116) is implemented as computer instructions, e.g., computer code, stored on a persistent storage that when executed by a processor of the production host (e.g., 110A, 110N) causes the production host (110A, 110N) to provide the functionality of the backup agent (116) described throughout this application.

Figure 5:
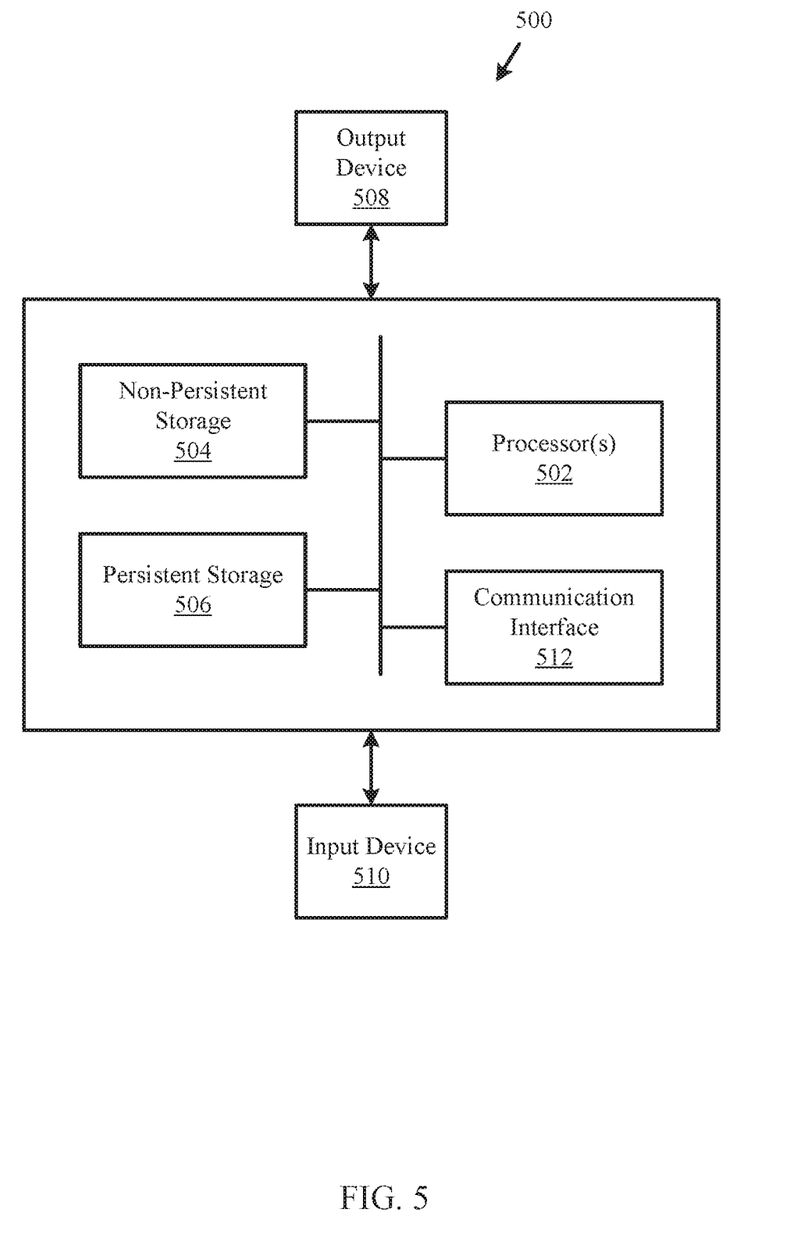
FIG. 5 shows a diagram of a computing device in accordance with one or more embodiments of the invention.

In one or more embodiments of the invention, the production host (110A, 110N) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (110A, 110N) described throughout this application.

In one or more embodiments of the invention, the production host (110A, 110N) is implemented as a logical device. The logical device may utilize the computing resources of any number of computing devices and thereby provide the functionality of the production host (110A, 110N) described throughout this application.

In one or more embodiments of the invention, the client(s) (100) utilize services provided by the production host (110). Specifically, the client(s) (100) may utilize the applications in the applications (112A, 112N) to obtain, modify, and/or store data. The data may be generated from applications hosted in the application (112).

In one or more embodiments of the invention, a client (100) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client (100) described throughout this application.

In one or more embodiments of the invention, the client(s) (100) are implemented as a logical device. The logical device may utilize the computing resources of any number of computing devices and thereby provide the functionality of the client(s) (100) described throughout this application.

In one or more embodiments of the invention, the backup storage system (150) stores backups of a file system. The file system may include application data of the applications (e.g., 112). The backups may further include application dependency information. In one or more embodiments of the invention, a backup is a full or partial copy of one or more applications (e.g., 112A, 112N). The copy may include the application data and/or application dependency information.

In one or more embodiments of the invention, a backup (152, 154) in the backup storage system (150) is an incremental backup. In one or more embodiments of the invention, an incremental backup is a backup that only stores changes in the persistent storage system that were made after a previous backup in the backup storage system. In contrast, a full backup may include all of the data in the persistent storage system (120) without taking into account when the data had been modified or otherwise written to the persistent storage system (120).

In one or more embodiments of the invention, if the data in the file system is to be restored to a point in time associated with an incremental backup, the required backups needed to perform the restoration include at least: (i) the incremental backup, (ii) a full backup, and (iii) the intermediate backups (if any) that are associated with points in time between the full backup and the incremental backups. In this manner, the required backups collectively include all of the data of the persistent storage system (120) at the requested point in time.

In one or more embodiments of the invention, each backup (152, 154) in the backup storage system (150) is either a file-system backup or a block-based backup. In one or more embodiments of the invention, a file-system backup is a backup generated by identifying the assets in the file system and generating a copy of all assets (or a portion thereof). In contrast, a block-based backup is generated by identifying the data blocks in the persistent storage system of a production host (e.g., 110A, 110N) and generating copies of all data blocks (or a portion thereof). The data in a file-system backup and of a block-based backup may be similar or different without departing from the invention.

In one or more embodiments of the invention, the backup storage system (150) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage system (150) described throughout this application.

In one or more embodiments of the invention, the backup storage system (150) is implemented as a logical device. The logical device may utilize the computing resources of any number of computing devices and thereby provide the functionality of the backup storage system (150) described throughout this application.

In one or more embodiments of the invention, the backup storage metadata repository (160) is a storage system that stores metadata associated with the backups (152, 154) stored in the backup storage system. The backup storage metadata repository (160) may store entries (also referred to as backup metadata entries) that track how the backup data is stored in the backup storage system. The backup metadata entries may be used by the backup agent (116) when performing the backup verification of FIG. 3A.

In one or more embodiments of the invention, the backup metadata storage repository is a secondary storage system that is separate from the backup storage system (150). Because the data stored in the secondary storage system is smaller in size, the data in the secondary storage system is less likely to experience unexpected changes (e.g., corruption). Further, the secondary storage system may include persistent storage in a well-maintained environment in which corruption, or other unexpected modification to the data, is minimized. In this manner, it may be assumed that the data in the backup storage metadata repository (160) is always in a healthy state. For additional details regarding the backup storage metadata repository, see, e.g., FIG. 2.

Figure 2:
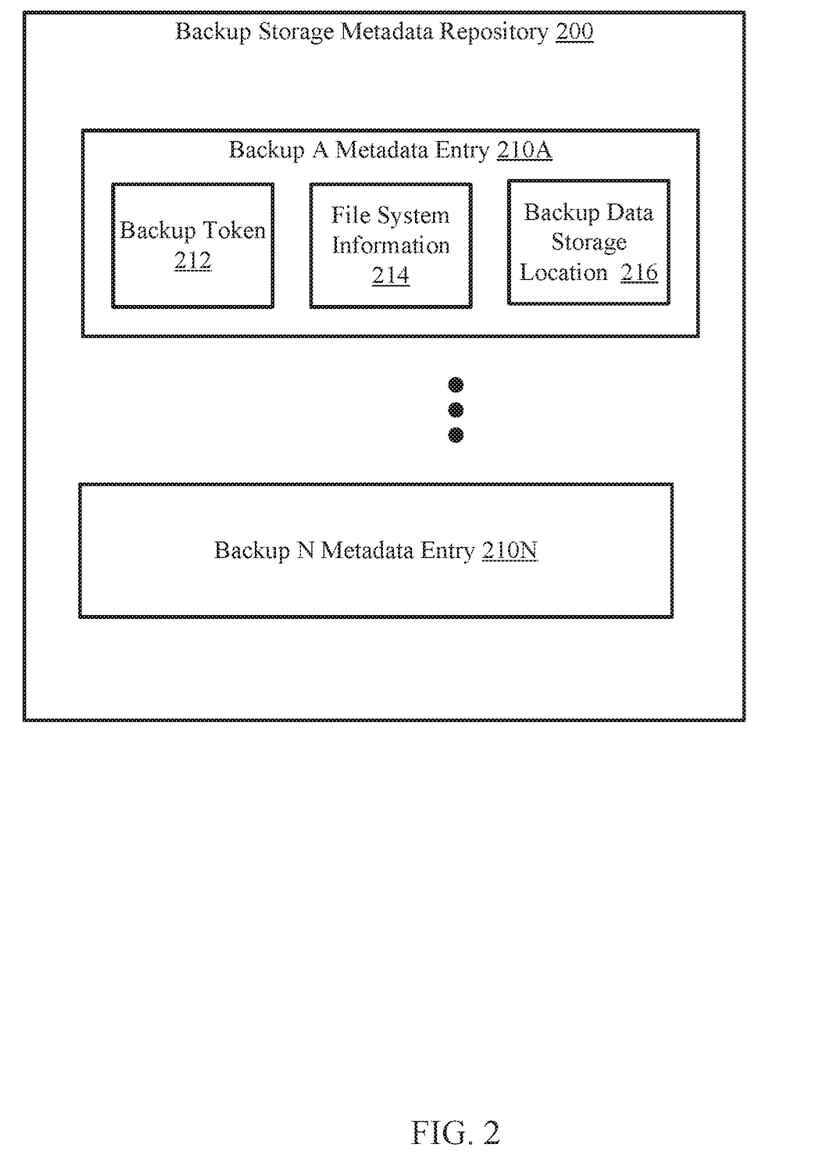
FIG. 2 shows a diagram of a backup storage metadata repository in accordance with one or more embodiments of the invention.

FIG. 2 shows a diagram of a backup storage metadata repository (200). The error message repository (200) may be an embodiment of the backup storage metadata repository (160, FIG. 1) discussed above. The backup storage metadata repository (200) may include one or more backup metadata entries (210A, 210N). Each error message (210A, 210N) may include a backup token (212), file system information (212) and backup data storage location (214). The backup storage metadata repository (200) may include additional, fewer, and/or different components without departing from the invention. Each of the aforementioned components illustrated in FIG. 2 is discussed below.

In one or more embodiments of the invention, the backup token (212) is a combination of letters, numbers, and/or symbols that uniquely identifies a backup stored in a backup storage system. The backup token (212) may be generated using the backup data of the corresponding data. The backup token (212) may be generated by performing an encryption algorithm or another algorithm (e.g., a hash function) on all or a portion of the backup data. The backup token may vary based on the data that is modified in the asset. For example, a backup token of the backup at a first point in time may be drastically different from a second backup token of the backup at a second point in time if any backup data in the backup is added, deleted, and/or otherwise modified after the first point in time.

In one or more embodiments of the invention, the file system information (214) specifies information about the file system in the backup at the time of the generation of the backup. The information may include, for example, the data objects (e.g., files) stored in the backup, to data blocks in the backup and their association to other data blocks in the backup, and/or any other metadata that may be used to reconstruct (or otherwise generate) a hierarchical structure of the file system. The hierarchical structure may specify the mapping between the references and the data blocks. In this manner, the file system may be reconstructed and utilized when accessing the backup data.

In one or more embodiments of the invention, the backup data storage location (216) is additional metadata that specifies the storage location of data blocks associated with the backup. The storage location may specify the organizational storage of each data block of the backup data in the backup storage system.

Figure 3A:
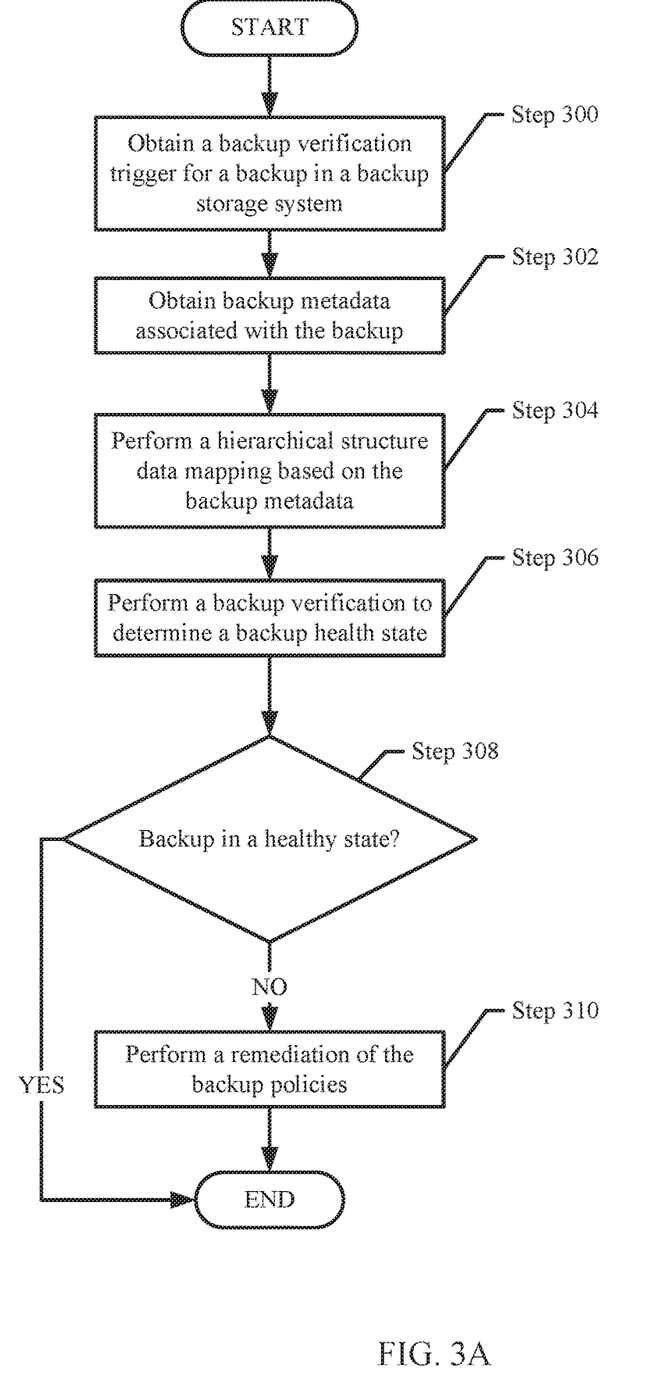
FIG. 3A shows a flowchart for performing a backup data verification in accordance with one or more embodiments of the invention.
Figure 3B:
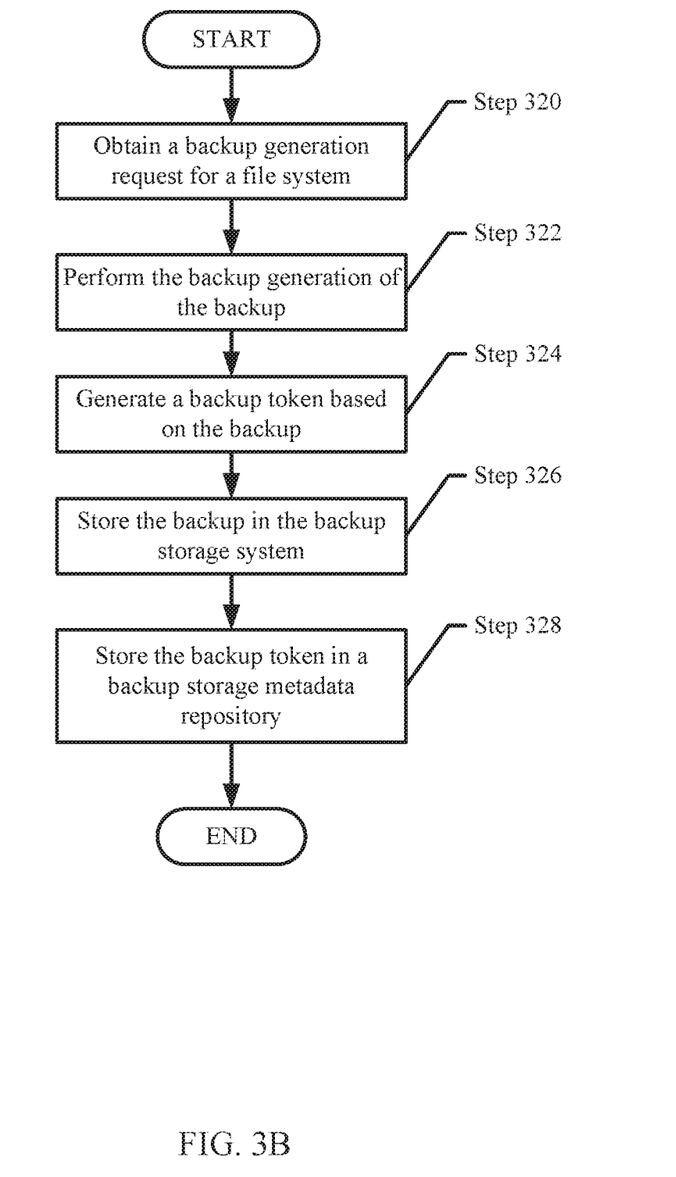
FIG. 3B shows a flowchart for generating a backup of a file system in accordance with one or more embodiments of the invention.

FIGS. 3A-3B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3B may be performed in parallel with any other steps shown in FIGS. 3A-3B without departing from the scope of the invention.

FIG. 3A shows a flowchart for performing a backup data verification in accordance with one or more embodiments of the invention. The method shown in FIG. 3A may be performed by, for example, a backup agent (116, FIG. 1). Other components of the system illustrated in FIG. 1 may perform the method of FIG. 3A without departing from the invention.

In step 300, a backup verification trigger for a backup in a backup storage system is obtained. The backup verification trigger may be based on backup verification policies implemented by the backup agent. The backup verification policies may specify a frequency in which to perform the backup verification. The backup verification trigger may be an initiation of the backup verification.

In step 302, backup metadata associated with the backup is obtained. In one or more embodiments of the invention, the backup metadata is obtained from the backup storage metadata repository discussed above. The corresponding backup metadata entry may be identified based on the backup to be verified and obtained (or otherwise accessed).

In step 304, a hierarchical structure data mapping is performed based on the backup metadata. In one or more embodiments of the invention, the hierarchical structure data mapping is a reconstruction (or otherwise generation) of the hierarchical structure based on the file system information obtained in the backup metadata. The reconstruction may be performed by identifying the references specified in the file system information and identifying the dependencies in assets and/or any directories in which each asset is a reference. In this manner, each asset in the backup is mapped to a reference in the backup.

In step 306, a backup verification is performed to determine a backup health state. In one or more embodiments of the invention, the backup verification is performed by accessing each asset and/or data blocks associated with the backup in the backup storage system and performing a data calculation on the data (in the backup storage system) to generate comparable values.

In one or more embodiments of the invention, the backup verification is performed by traversing the data in an order based on the hierarchical structure data mapping performed in step 304. For example, the backup verification is performed on each file in the file system in an order specified in the reconstructed hierarchical structure. The backup verification may be performed via any order and/or via any organization without departing from the invention.

The calculations may result in, for example, a checksum of all or portions (e.g., data blocks) of each asset of the backup in the backup storage system, a hash value of each asset of the backup, etc. The calculations may result in other values without departing from the invention. The generated comparable values from the calculations may be compared to values generated on the backup at the time of the backup generation using an identical calculation on the data.

Because the data may experience unexpected modifications during the transfer and/or storage of the backup to the backup storage system, the comparable values and the previously-generated values may not be identical. As such, if the two values (i.e., the comparable values and the previously-generated values) do not match, the backup may be assigned as being in an unhealthy state. In contrast, if the two values match, the backup may be assigned as being in a healthy state.

In one or more embodiments of the invention, the backup verification performed on the backup data includes performing secondary checks on the backup data to ensure the backup data stored in the backup storage system matches the data in the file system used to generate the backup at the time of the backup generation. The secondary checks may include, for example, obtaining a duplicate of the data in the file system at the time of the backup generation (e.g. stored in the production host environment, the backup storage system, and/or a secondary storage system) and performing calculations to the files in the file system from the duplicate and performing identical calculations to the backup data in the backup storage system and comparing the results to determine the state of the backup. If the results are compared and there are inconsistencies (e.g., the results do not match), the backup may be assigned as being in an unhealthy state. If the results are compared and there are no inconsistencies, the backup may be assigned as being in a healthy state.

In step 308, a determination is made about whether the backup is in a healthy state. The determination is made based on the backup verification performed in step 306. For example, if the previously-generated checksums of the data in the file system do not match the checksums generated for the backup data in the backup storage system, the backup may be deemed an unhealthy state. In contrast, if the checksums do match, the backup may be deemed a healthy state. If the backup is in a healthy state, the method ends following step 308; otherwise, the method proceeds to step 310.

In step 310, following the determination that backup is not in a healthy state, a remediation of the backup policies is performed. The remediation may include specifying initiating a full backup the next time a backup is scheduled. Because an incremental backup scheduled to be performed later may depend on a backup that is not in a healthy state, the remediation prevents the following backup from depending on a potentially corrupted backup.

FIG. 3B shows a flowchart for generating a backup of a file system in accordance with one or more embodiments of the invention. The method shown in FIG. 3B may be performed by, for example, a backup agent (116, FIG. 1). Other components of the system illustrated in FIG. 1 may perform the method of FIG. 3B without departing from the invention.

In step 320, a backup generation request for a backup of a file system is obtained. The backup generation request may be obtained from a client managing the initiation of backups. Alternatively, the backup request may be the result of the backup agent implementing backup policies. As discussed above, the backup policies may include schedules that specify when to perform a backup of the persistent storage device. The backup request may specify the applications to be backed up.

In step 322, the backup generation of the backup is performed. The backup generation includes identifying the data in the file system to be backed up, and generating a copy of the data to generate the backup data. The data to be backed up may be determined based on whether the backup is a full backup or an incremental backup and, if it is an incremental backup, may be further based on the previous most recent backup of the file system.

In step 324, a backup token is generated based on the backup. In one or more embodiments of the invention, the backup token is generated by performing an encryption algorithm or other algorithm on all or a portion of the backup data. The algorithm may be, for example, a hash function (or algorithm) Other functions (or algorithms) may be performed on the backup data to generate the backup token without departing from the invention.

In step 326, the backup is stored in the backup storage system. The backup may be stored by transferring the backup data in the backup storage system and generating metadata associated with the storage location of the data blocks in the backup storage system.

In step 328, the backup token is stored in a backup storage metadata repository. As discussed above, the backup storage metadata repository may be a secondary storage system separate from the backup storage system in which the backup is stored.

In one or more embodiments of the invention, the backup token is used to verify the overall state of the backup either periodically or before a recovery. The backup may be verified by performing a second verification. The second verification may include obtaining the data associated with the backup from the backup storage system, regenerating a second backup token using the algorithm performed in step 324, and comparing the regenerated backup token to the backup token generated in step 324. If the backup tokens do not match, additional remediation may be performed on the backup. The additional remediation may include sending a notification to a client of the corrupted backup and/or initiating a new full backup of the file system. Other additional remediation may be performed without departing from the invention.

Example

Figure 4A:
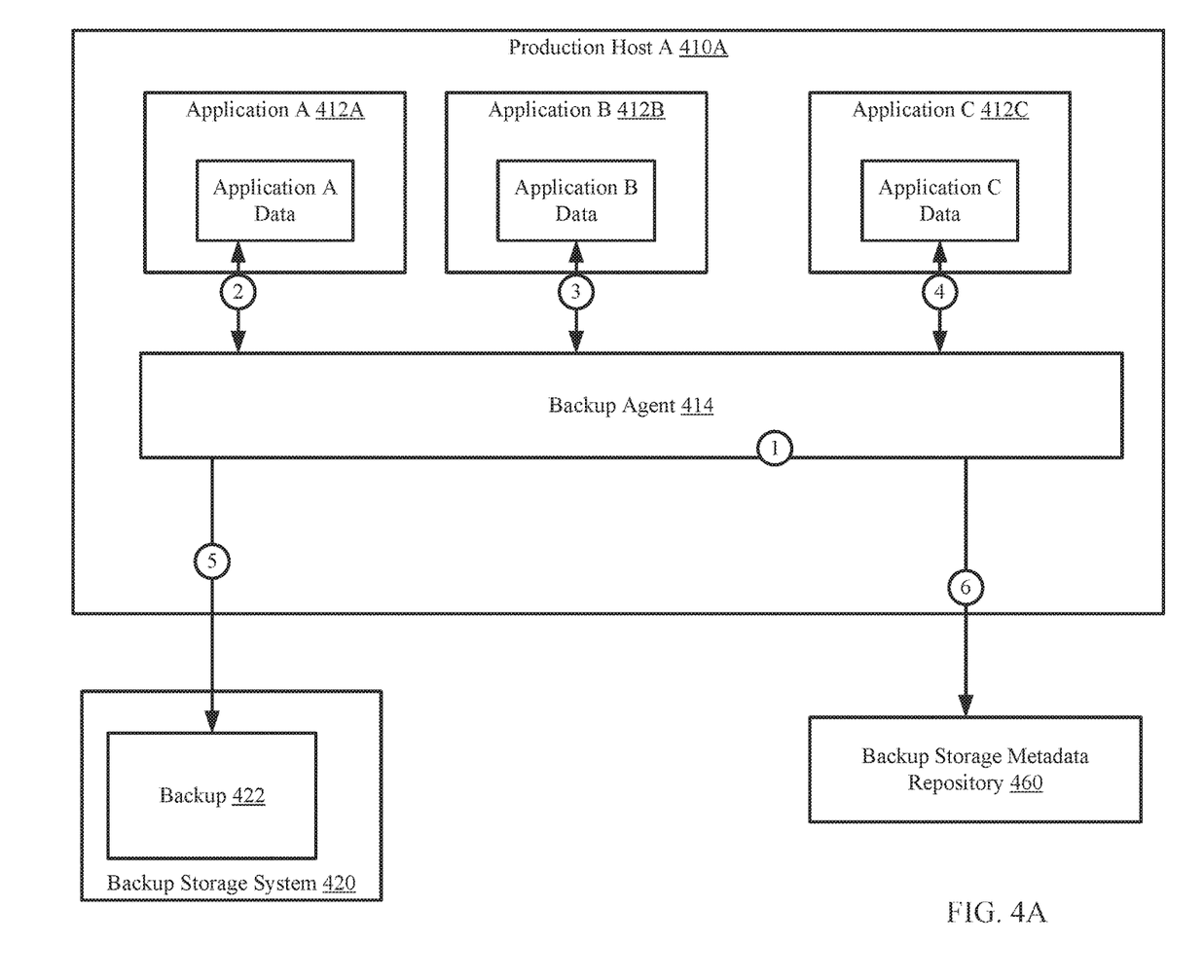
FIGS. 4A-4B show an example in accordance with one or more embodiments of the invention.
Figure 4B:
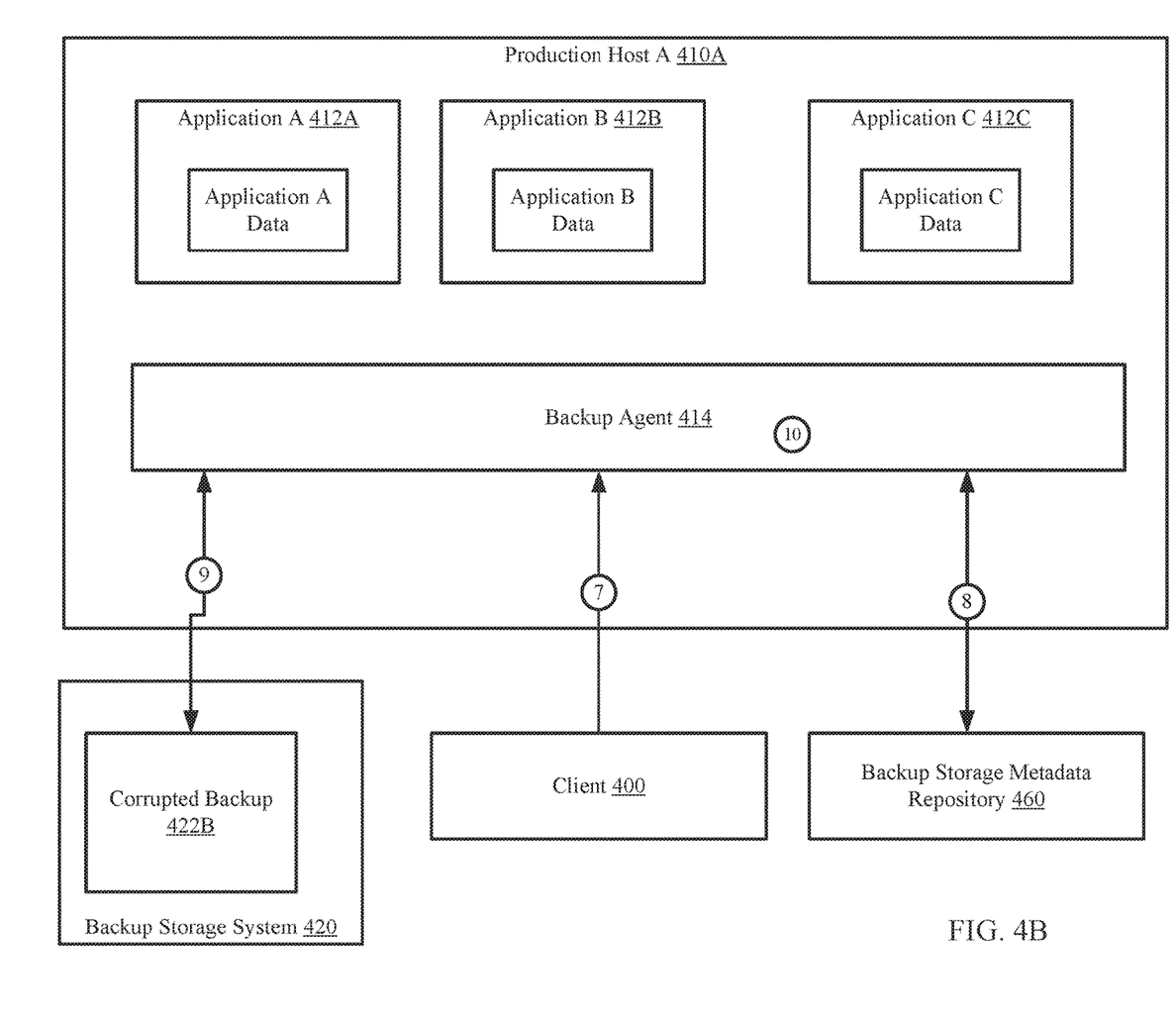

The following section describes an example. The example, illustrated in FIGS. 4A-4B, is not intended to limit the invention. Turning to the example, consider a scenario in which a production host performs an incremental backup of a file system comprising three files (file A, file B, file C).

FIG. 4A shows a first diagram of an example system. For the sake of brevity, not all components of the example system are illustrated in FIG. 4A. The example system includes a production host (410), a client (400), a backup storage system (420), and a backup storage metadata repository (460). The production host (410) includes application A (412A), application B (412B), and a backup agent (414).

The backup agent (414), utilizing backup policies (not shown), initiates a backup operation that includes backing up a file system that includes application data for applications A, B, and C (412A, 412B, 412C) [1]. The backup agent (414) obtains the copy of each application data specified in the file system [2, 3, 4]. After the backup is generated, a series of calculations are performed on each asset to obtain a checksum of each asset. The backup (422) is stored in the backup storage system (420) [5]. The checksums may be stored in a secondary storage system. Specifically, the checksums are stored in the backup storage metadata repository (460). Further, the organizational storage of the backup (422) in the backup storage system (420) may be specified in backup data storage location metadata that is also stored in the backup storage metadata repository (460) [6]. Additionally, file system information associated with the application data and the dependencies to each other is stored in the backup storage metadata repository (460). Collectively, the checksums, the backup data storage location, and the file system information are referred to as the backup metadata of the backup (422).

FIG. 4B shows a second diagram of the example system. At a later point in time, a client (400) sends a request for verification of the backup (422) stored in the backup storage system (420) [7]. At this point in time, the backup (422B) has become corrupted while stored in the backup storage system (420). The backup agent (414), in response to the request, obtains the backup metadata associated with the backup (422B) from the backup storage metadata repository (460) [8]. After obtaining the backup metadata from the backup storage metadata repository (460), the backup agent (414) performs the method of FIG. 3A on a corrupted backup (422B). Specifically, the backup agent (414) uses the file system information to recreate the file system at the time of the generation of the backup. Further, the backup agent uses the backup data storage information to identify the storage location of each data block in the corrupted backup (422B) in the backup storage system (420).

Using the storage location and the file system information, the backup agent (414) is able to access the backup (422B) from the backup storage system (420) and recreate the hierarchical structure of the application data. Using the hierarchical structure, the backup data is traversed in the corrupted backup, and a second set of checksums is generated using the backup data from the corrupted backup (422B) [9]. The second set of checksums is compared to the first set of checksums obtained from the backup storage metadata repository (460). The comparison results in mismatches between the two sets. Because the mismatch is an indication of the backup being corrupted, the corrupted backup is assigned an unhealthy state. Based on this assignment, the backup policies (not shown) are updated to specify performing a full backup on the next backup schedule. The update to the backup policies prevents a future backup from depending on the corrupted backup (422B).

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506).

Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the backup operations for data in a file system. Embodiments of the invention enable a backup verification of data in the backup without having to perform transfers of the backup between the backup storage system in which the backup is stored and the production host hosting the original data. Embodiments of the invention, by performing the data verification, prevent incremental backups from being generated that depend on backups deemed in an unhealthy state.

Thus, embodiments of the invention may address the problem of inefficient use of computing resources. This problem arises due to the technological nature of the environment in which backup operations are performed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing a persistent storage system, the method comprising:
   obtaining, by a backup agent, a backup verification trigger for a backup stored in a backup storage system;
   in response to the backup verification trigger,
      obtaining backup metadata associated with the backup;
      performing a hierarchical structure data mapping based on the backup metadata to obtain a hierarchical structure associated with the backup;
      performing, using the hierarchical structure, a backup verification to generate a backup health state of the backup;
      after the backup verification is generated:
         making a determination, based on the backup verification, that the backup health state is not in a healthy state; and
         in response to the determination, performing a remediation of the backup policies.

2. The method of claim 1, wherein the backup metadata is stored in a backup storage metadata repository.

3. The method of claim 2, wherein the backup metadata storage repository is a secondary storage system separate from the backup storage system.

4. The method of claim 2, further comprising:
   obtaining a backup generation request for a file system;
   performing, in response to the backup generation request, a backup generation to obtain the backup;
   generating a backup token based on the backup;
   storing the backup in the backup storage system; and
   storing the backup token in the backup storage metadata repository.

5. The method of claim 4, further comprising:
   after storing the backup in the backup storage system, obtaining the backup token from the backup storage metadata repository;
   generating a second backup token using data stored in the backup;
   comparing the backup token and the second backup token;
   making a second determination that the backup token and the second backup token do not match; and
   in response to the second determination, performing a second remediation of the backup.

6. The method of claim 1, wherein the backup metadata comprises a backup token, file system information, and backup data storage location associated with backup data of the backup.

7. The method of claim 1, wherein performing the remediation comprises changing the next scheduled backup to a full backup.

8. A system, comprising:
   a processor; and
   memory comprising instructions which, when executed by the processor, perform a method, the method comprising:
      obtaining, by a backup agent, a backup verification trigger for a backup stored in a backup storage system;
      in response to the backup verification trigger,
         obtaining backup metadata associated with the backup;
         performing a hierarchical structure data mapping based on the backup metadata to obtain a hierarchical structure associated with the backup;
         performing, using the hierarchical structure, a backup verification to generate a backup health state of the backup;
         after the backup verification is generated:
            making a determination, based on the backup verification, that the backup health state is not in a healthy state; and
            in response to the determination, performing a remediation of the backup policies.

9. The system of claim 8, wherein the backup metadata is stored in a backup storage metadata repository.

10. The system of claim 9, wherein the backup metadata storage repository is a secondary storage system separate from the backup storage system.

11. The system of claim 8, the method further comprising:
    obtaining a backup generation request for a file system;
    performing, in response to the backup generation request, a backup generation to obtain the backup;
    generating a backup token based on the backup;
    storing the backup in the backup storage system; and
    storing the backup token in the backup storage metadata repository.

12. The system of claim 11, the method further comprising:
    after storing the backup in the backup storage system, obtaining the backup token from the backup storage metadata repository;
    generating a second backup token using data stored in the backup;
    comparing the backup token and the second backup token;

making a second determination that the backup token and the second backup token do not match; and in response to the second determination, performing a second remediation of the backup.

13. The system of claim 8, wherein the backup metadata comprises a backup token, file system information, and backup data storage location associated with backup data of the backup.

14. The system of claim 8, wherein performing the remediation comprises changing the next scheduled backup to a full backup.

15. A non-transitory computer readable medium comprising computer readable program code, which when executed by a computer processor enables the computer processor to perform a method, the method comprising:

obtaining, by a backup agent, a backup verification trigger for a backup stored in a backup storage system;

in response to the backup verification trigger,
  obtaining backup metadata associated with the backup;
  performing a hierarchical structure data mapping based on the backup metadata to obtain a hierarchical structure associated with the backup;
  performing, using the hierarchical structure, a backup verification to generate a backup health state of the backup;
  after the backup verification is generated:
    making a determination, based on the backup verification, that the backup health state is not in a healthy state; and
    in response to the determination, performing a remediation of the backup policies.

16. The non-transitory computer readable medium of claim 15, wherein the backup metadata is stored in a backup storage metadata repository.

17. The non-transitory computer readable medium of claim 16, wherein the backup metadata storage repository is a secondary storage system separate from the backup storage system.

18. The non-transitory computer readable medium of claim 16, the method further comprising:

obtaining a backup generation request for a file system;
performing, in response to the backup generation request, a backup generation to obtain the backup;
generating a backup token based on the backup;
storing the backup in the backup storage system; and
storing the backup token in the backup storage metadata repository.

19. The non-transitory computer readable medium of claim 18, the method further comprising:

after storing the backup in the backup storage system, obtaining the backup token from the backup storage metadata repository;
generating a second backup token using data stored in the backup;
comparing the backup token and the second backup token;
making a second determination that the backup token and the second backup token do not match; and
in response to the second determination, performing a second remediation of the backup.

20. The non-transitory computer readable medium of claim 15, wherein performing the remediation comprises changing the next scheduled backup to a full backup.

* * * * *